Feb. 9, 1943.　　　　G. S. ALLIN　　　　2,310,727
TRACTOR
Filed March 26, 1941　　　3 Sheets-Sheet 1

INVENTOR
GEORGE S. ALLIN
BY
Cook & Robinson
ATTORNEY

Feb. 9, 1943.   G. S. ALLIN   2,310,727
TRACTOR
Filed March 26, 1941   3 Sheets-Sheet 2

INVENTOR
GEORGE S. ALLIN
BY
Cook & Robinson
ATTORNEY

Feb. 9, 1943.　　　　　G. S. ALLIN　　　　　2,310,727
TRACTOR
Filed March 26, 1941　　　　3 Sheets-Sheet 3
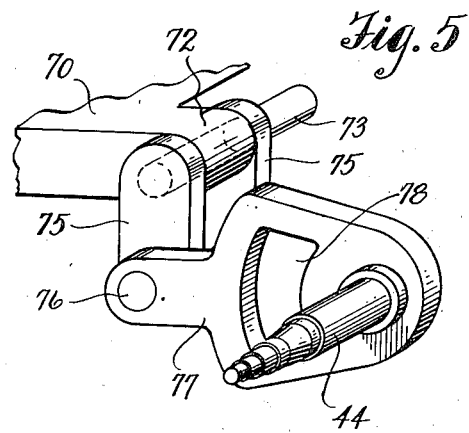
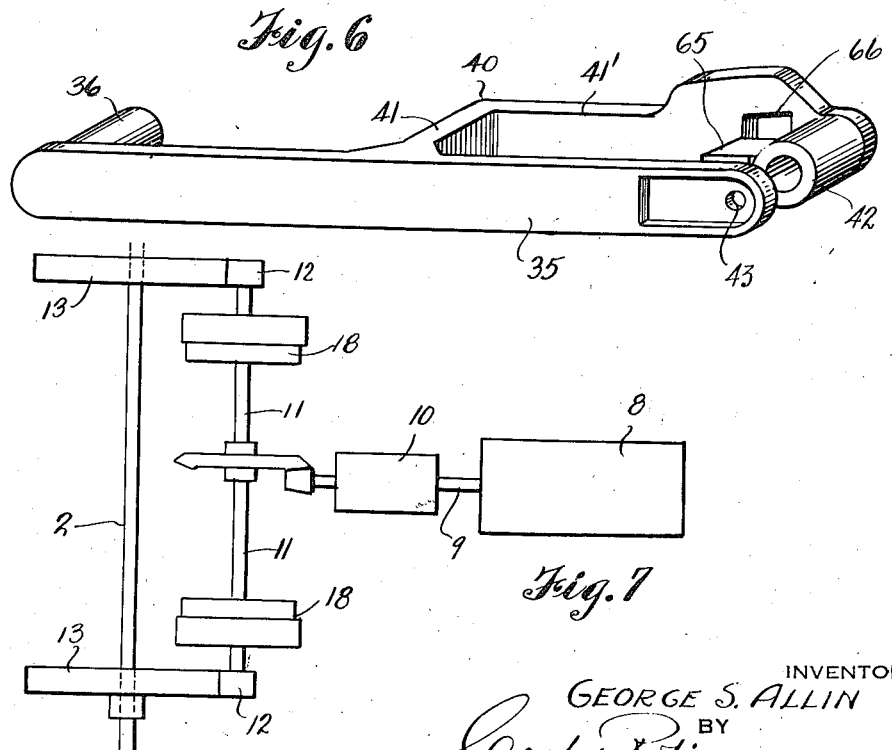
INVENTOR
GEORGE S. ALLIN
BY
Cook & Robinson
ATTORNEY Patented Feb. 9, 1943

2,310,727

UNITED STATES PATENT OFFICE 2,310,727

TRACTOR

George S. Allin, Seattle, Wash., assignor to Isaacson Iron Works, Seattle, Wash., a corporation of Washington Application March 26, 1941, Serial No. 385,261

5 Claims. (Cl. 280—124)

This invention relates to improvements in tractors and has reference more particularly to four-wheeled tractors, having the wheels thereof arranged in tandem at opposite sides of the tractor frame with the rear wheel of the tandem set at each side mounted to rotate about a transverse, supporting axle, and the front wheel mounted by a swing frame from which the tractor frame is resiliently supported.

Furthermore, the invention relates to tractors of the above kind wherein propulsion is through driving connections between the wheels which are mounted by the transverse axle and a prime mover, and in which connections, selectively controlled clutch and brake mechanisms are included through which steering of the tractor may be accomplished in a manner like that employed for the steering of the usual crawler types or track-laying types of tractors.

It is one of the objects of this invention to provide a tractor of the character above referred to wherein the front wheel, or that wheel at each side that is mounted by the swing frame, is driven from the complemental wheel of the tandem set or directly from the driving mechanism for that complemental wheel, and wherein there is a predetermined and established relationship between wheel diameter and wheel base, and also an established relationship between wheel base and width of tread that has been found most practical and effective as a means for insuring adequate maneuverability with safe and satisfactory steering control of the tractor without detriment to its utility.

Still another object of this invention is to provie a wheeled track replacement unit of the character for use with crawler type tractors of a special make now in general use, either as original equipment, or as replacement units for the original crawler track equipment, applicable without any change of the original structure of the tractor.

Explanatory to the present invention, it will be here noted that in a co-pending application, filed on May 28, 1940, under Serial No. 337,647, Patent No. 2,265,986, Dec. 16, 1941, I have disclosed a four-wheeled tractor of the kind above referred to and have described a specific track replacement equipment that was designed especially for use with "International" tractors. In another application, filed on January 21, 1941, under Serial No. 375,279, Patent No. 2,284,790, June 2, 1942, I disclosed a four wheeled tractor and described specifically a replacement equipment for "Caterpillar" tractors. However, in neither of the applications above identified, as originally filed, were the reasons and advantages of the present relationship of wheel diameter, wheel base, and wheel tread, especially discussed or explained; this being due to the fact that experiment had not yet fully established the present relationships as the most desirable.

The present specification will deal not only with the established relationship of wheel diameter to wheel base, and wheel base to width of tread, but also to the special details of construction and combination of parts of a wheeled equipment for use with tratcors made by the Allis-Chalmers Company. Therefore, further objects of the present invention reside in the specific details of construction and combination of parts whereby wheeled equipment of the kind previously disclosed is adapted specifically to the Allis-Chalmers tractor.

In accomplishing the above enumerated and other objects of the invention, I have provided the improved details of construction, the preferred forms of which are illustrated in the accompanying drawings, wherein Fig. 1 is a side view of a four-wheeled tractor embodying improvements in accordance with the present invention.

Fig. 5 is a perspective view of the stabilizing linkage for a swing frame.

Fig. 6 is a perspective view of the swing frame with wheels removed.

Fig. 7 is a diagrammatic view in plan of the driving connections between the prime mover of the tractor and the wheels at opposite sides thereof.

Figure 1:
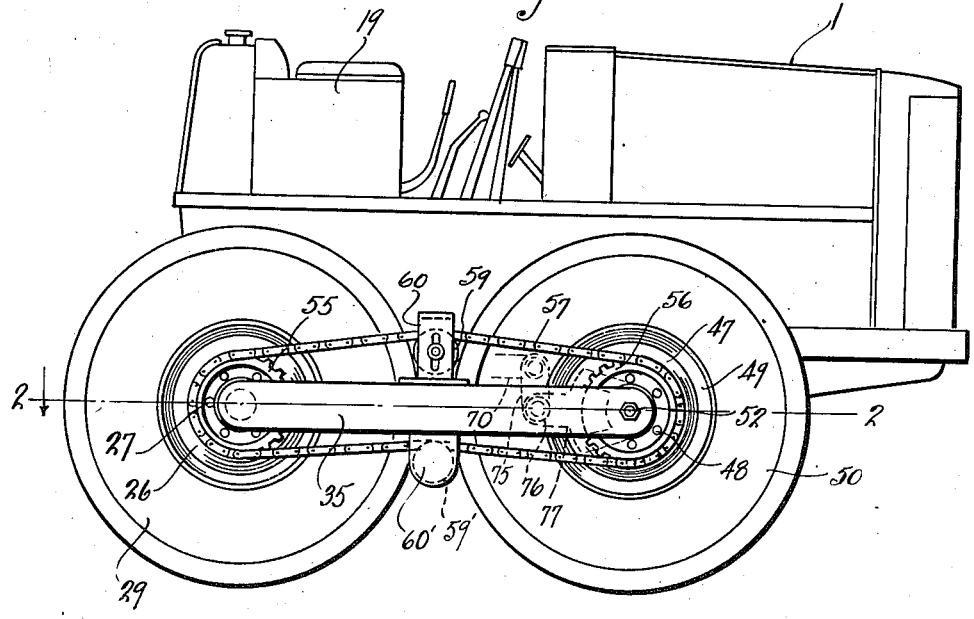

Referring more in detail to the drawings—

The herein illustrated "Allis-Chalmers" tractor comprises a main body and frame structure which is designated in its entirety by reference numeral 1. This body structure is supported at its rearward end through the mediacy of a transverse, pivot axle 2 and is supported at a forward location by a transverse equalizer spring 3. This spring is mounted in a yoke 4, which in turn is mounted in the tractor frame centrally between the opposite sides, by a longitudinally directed pivot bolt designated by numeral 5 in Fig. 3. The transverse axle 2 is fixed rigidly in the main frame structure of the body of the tractor, with its opposite end portions extended equally beyond opposite sides of the main frame structure. Heretofore, it has been the usual function of these extended end portions of the transverse axle 2 to mount the rear ends of crawler track frames that extend along opposite sides of the tractor frame and which, at their forward ends, support the opposite ends of the transverse equalizer spring. This is mentioned only because it is desired to point out that the present equipment is so designed that it may be applied to already existing "Allis-Chalmers" tractors without requiring any alteration in their original structure.

Figure 2:
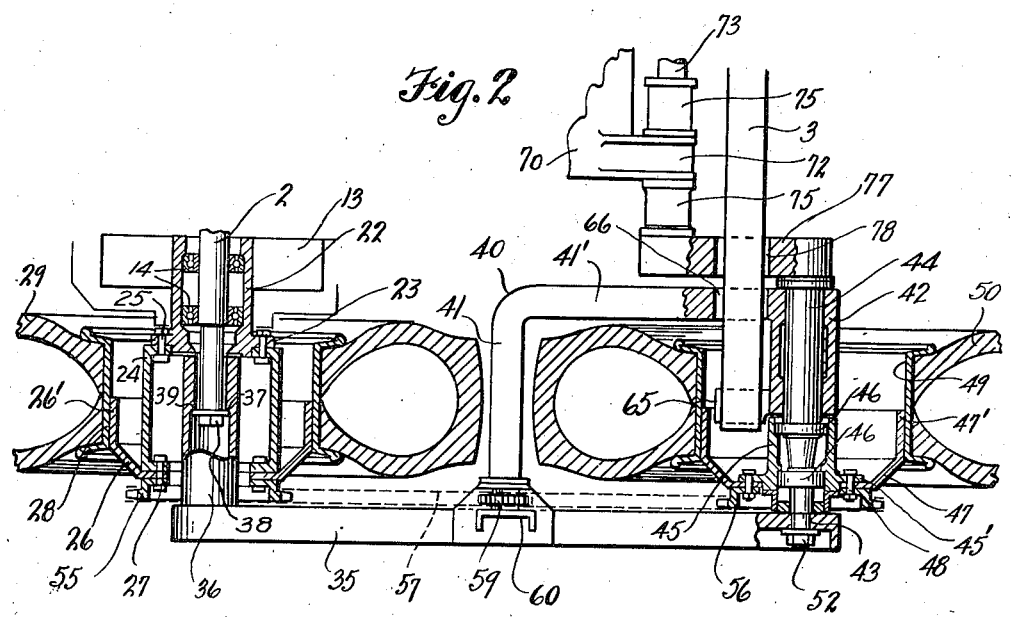
Fig. 2 is a horizontal, sectional view, taken on the line 2—2 in Fig. 1, particularly illustrating the wheeled unit and the means for driving the wheels. Also, disclosing the structure of the swing frame and its connection with the stabilizing means.

Mounted in the main frame structure of the tractor, is the engine, or prime mover, indicated at 8, having its drive shaft 9 extended rearwardly and to a speed transmission gear mechanism designated generally at 10, and is there operatively connected with lateral shafts 11—11 which are equipped at their outer ends respectively with pinions 12—12 which are in driving mesh with larger gear wheels 13—13 that are mounted, through the mediacy of suitable bearings 14, to rotate about the opposite end portions of the pivot axle 2, as will be understood best by reference to Fig. 2. Clutch and brake units of conventional form, designated at 18, are interposed in the lateral axles 11—11, and these units are jointly and selectively operable to cause the lateral shafts 11—11 to be held or to be driven as required for propulsion and steering.

The usual brake and clutch control levers and pedals are provided adjacent the driver's position, for actuation by the operator or driver of the vehicle. Such levers are shown in Fig. 1, just forwardly of the driver's seat 19, but the connections between them and the units 18 are not herein shown.

It is intended that in the use of the present four-wheeled unit, steering and propulsion of the tractor will be effected in the same manner and through the same character of means as employed for the propulsion, steering and control in the usual crawler track equipment. Thus, forward and reverse driving is through the shaft 9, transmission gearing 10, shafts 11—11 and the clutch and brake devices 18, and steering control is accomplished by a selective control of the brake and clutch untis.

The tandem-wheeled units which I have provided at opposite sides of the tractor are alike in construction, except as required for their accommodating opposite sides of the tractor; one set being "right" and the other "left." However, in the following description, only one unit or set will be described in detail, with the understanding that its description relates equally to both.

Referring now more particularly to the showing of the parts in Fig. 2; it will be observed that the driven gear wheel 13 which is mounted to rotate about the extended end portion of the axle 2, has an outwardly extended hub portion 22 terminating in an outturned flange 23, to which the inner, flanged end of a cylindrical hub extension 24 of substantial diameter is fixed by bolts 25. To the outer flanged end of the hub extension 24, an inwardly inclined wheel body disk 26 is attached by bolts 27. The disk 26 is concentric of the hub cylinder 24 and also of axle 2, and it has an integral inturned peripheral flange 26' which mounts a wheel rim 28 thereon, and the wheel rim, in turn, mounts a pneumatic tire 29. The rear wheel unit, considered in its entirety, embodies the tire 29, the rim 28, the body disk 26 and hub 24, and this is mounted to rotate as a unit, with the driven gear wheel 13, about the extended end portion of the axle 2. The axle 2 extends approximately halfway through the hub cylinder 24 and serves as a mounting means for one end of the swing frame structure at that side of the tractor.

The swing frame structure, as disclosed best in Figs. 2 and 6, comprises a horizontally disposed beam 35, extended along the side of the tractor, at the outside of the rear wheel, and pivotally mounted at its rearward end on the extended end portion of the pivot shaft 2. The means for mounting this swing frame beam 35 comprises a tubular bearing hub 36 that is secured to or integrally formed with the rear end of the beam, at a right angle thereto. This hub extends into the cylindrical hub member 24 and at its inner end is applied to and revolubly contains the extended end portion of the axle 2 therein. A washer 37 is fixed by a bolt 38 to the end of the shaft 2, and this washer engages with an annular shoulder 39 in the hub 36 to hold the parts functionally assembled, as shown in Fig. 2. Thus, the beam 35 may swing vertically at its forward end about the axial line of axle 2.

Fixed to the beam 35, just forwardly of the rear wheel, is an angularly formed bracket 40 comprising a leg 41 that is rigidly and solidly attached to the beam 35 and extends directly inwardly therefrom, and a leg 41' that extends forwardly from the inner end of the leg 41, parallel with and terminating approximately even with the forward end of the beam 35. At the forward end of the leg 41' is an outwardly directed tubular bearing hub 42 and mounted in this hub and extending outwardly beyond and through an opening 43 in the forward end portion of beam 35, is a spindle shaft 44 about which the front wheel of the tandem set is mounted to revolve. This front wheel comprises a hub member 45 which is revolubly mounted on the spindle shaft 44 through the mediacy of suitable bearings 46—46, a wheel body disk 47 that is secured to the hub flange 45' by means of bolts 48, a wheel rim 49 that is mounted upon an inturned flange 47' of the wheel body disk, and a pneumatic tire 50 that is mounted by the wheel rim 49. The outer end of the spindle shaft 44 is secured in the beam 35 by a nut 52 applied to the outer end of the spindle shaft.

It is to be particularly noted that the wheel body disk is located at the outside of the wheel and that the wheel body, as comprised by the disk 47 and rim 49, is substantially hollow and opens inwardly toward the tractor frame; also, that the front wheel is in tracking alignment with the rear wheel and both wheels are of the same diameter. Also, it is most practical and desirable that the tandem wheels be of substantial diameter and mounted as close together as possible, and that they be driven in unison.

In order that the tandem wheels will be driven in unison, sprocket wheels 55 and 56 are secured to the outer ends of the hub members of the wheels, and a sprocket chain belt 57 is extended about these sprocket wheels, as will be observed in Figs. 1 and 2. Also, it is desirable, but not essential, that these sprocket wheels be secured to their corresponding wheel hubs through the mediacy of the same bolts, 27 and 48, whereby the wheel body disks are secured to their corresponding hubs.

In Fig. 1, I have also shown that the runs of the sprocket chain belt between the front and rear wheel sprockets are supported by guide rollers 59—59' that are mounted by brackets 60—60' fixed on the beam 35 at a medial location. One of these rollers, here shown to be the upper one, is adjustably mounted for movement along the bracket to maintain a desired tension on the sprocket chain belt.

In order to resiliently support the main body through the mediacy of the equalizer spring, provision is made whereby opposite ends of the spring 3 may have supporting engagement with the swing frames. In the present instance, the ends of the equalizer spring extend into the hollow, inwardly opening front wheel bodies as shown in Fig. 2, and are supportingly disposed upon lugs, or brackets, 65 that are integral with and extend rearwardly from the spindle mounting hub bearing 42 of the bracket 40. In order that the end portion of the equalizer spring may have supporting engagement against the flat, top side of this lug without interference with the bracket incident to swinging motion of the swing frame beam 35, I have formed the bracket leg 41' with a vertically elongated opening 66, aligned with the lug 65 and through which the equalizer spring extends. This opening is of sufficient length vertically that the swing frame may oscillate freely to an adequate extent without interference by the spring where it passes through the bracket arm.

It is desirable, from the standpoint of economy and convenience, that the same devices used on the "Allis-Chalmers" tractor for mounting the track frame stabilizing linkage, be employed herein for mounting the swing frame stabilizing means. The original equipment of "Allis-Chalmers" tractors includes a casting 70 that is fixed solidly to the main frame structure, at a location centrally between opposite sides, and rearwardly of the equalizer spring. This casting is formed with transversely aligned, spaced bearings 72 in which a pivot shaft 73 is fitted for the hinged support or mounting of two downwardly depending links 75. The links 75 at each side of the central line of the tractor rotatably mount therein, at their lower ends, a shaft 76 which, at its outer end, is fixed rigidly to a forwardly extending crank arm 77, which, at its forward end mounts the spindle shaft 44 rigidly therein. The crank member, embodied by the arm 77, the mounting shaft 76 and the spindle shaft 44 are rigid, and the shafts 76 and 44 are in parallel alinement and at a right angle to the direction of the swing frame beam 35. As noted in Figs. 2 and 5, the arm 77 is widened for the provision of an opening 78 for the passage of the end portion of the equalizer spring, and this opening is given an arcuate, and vertically elongated form which is necessary for clearing the spring incident to the action of the swing frame.

It will be understood that with this arrangement of stabilizing parts, the swing frame beam 35 is free to oscillate vertically on the axle 2, and that the crank member and the links 75 at that side will effect a rigid brace against any lateral swinging of the beam 35 relative to the vertical plane of the beam.

As was previously stated, it has been an object of this invention to provide a four-wheeled structure that is easy to maneuver and control under all conditions of use. This has been accomplished through a determination of relationships of wheel diameter, wheel base and wheel tread. Wheel diameter is considered as the outside diameter of the wheel tires; wheel base is a distance between centers of wheels at the same side of the tractor, and wheel tread is the distance between ground contact lines of corresponding wheels at opposite sides of the tractor.

In tractors of this kind, where the tandem wheels at opposite sides are driven in unison for propulsion of the tractor, and where steering of the tractor is accomplished only by causing the wheels at one side to be driven at a different speed from those at the other side, or by holding the wheels at one side while driving those at the other, it has been demonstrated quite effectively that there are critical relationships between wheel base, wheel gauge and wheel diameter, and that these must be maintained in order to insure proper maneuverability; that is, a maneuverability that is required for practical and economical operations.

If the wheel base is lengthened without a proportionate increase in wheel diameter and gauge, the difficulty of, or ease of maneuverability is impaired accordingly. Without going into an extended explanation of the reasons, or any theory for this increase of difficulty in steering with the departure from certain ratios of relationships of wheel base, gauge and wheel diameter, it is thought sufficient to say that the theory is in accordance wtih the conditions found to apply in the steering of sleds. If a bob-sled has long runners, it is usually the case that auxiliary steering means is necessary, such as a pivoted truck at the front end of the sled, while, if the runners are shorter, then the steering may be accomplished more easily, provided they are not shortened too much. If the runners of a sled are made too short, or shorter than their spacing, or gauge, steering becomes difficult to control, and is considered dangerous.

Figure 3:
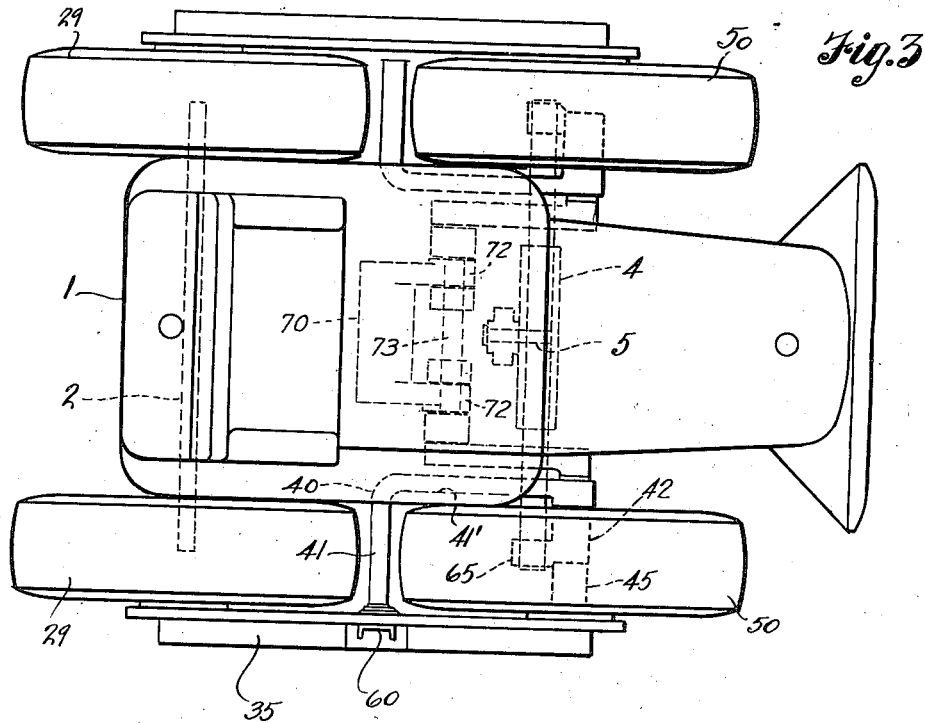
Fig. 3 is a plan view of the present tractor, showing the present relationship of wheel tread, wheel base and wheel diameter.
Figure 4:
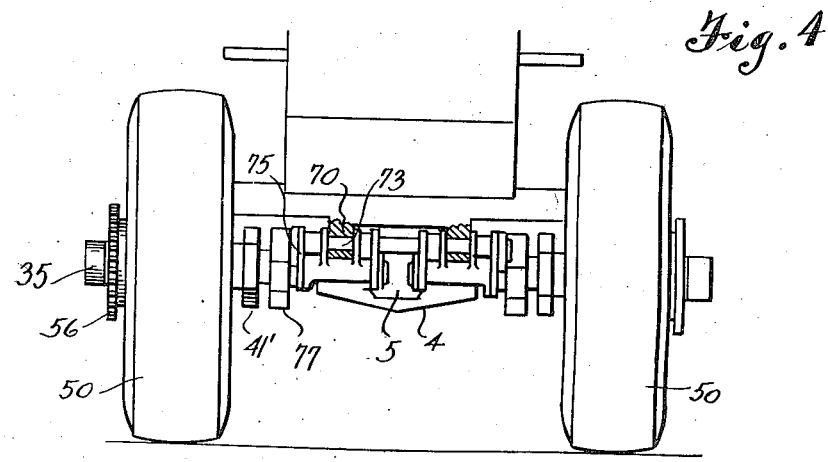
Fig. 4 is a front end view of the tractor showing the swing frame stabilizing means.

An inspection of the present tractor as seen in plan view of Fig. 3, shows that the points of contact of the four wheels with the ground are almost equally angularly spaced about, and equidistant from, a point in the center of the tractor. With this relationship of wheel base to gauge, turning and steering is easy, and especially so if the wheel diameter is substantially equal to or approaches near to the extent of wheel base.

The most satisfactory results, while still maintaining the most economical and practical structure, are obtained when the ratio of wheel diameter to wheel base does not exceed one to one and three-eighths, and where ratio of wheel base to wheel gauge likewise does not exceed one to one and three-eighths.

It has been demonstrated that the necessary ease of maneuverability for practical operation will be lost or overcome if these ratios are not substantially maintained. The loss of control of maneouverability will increase at approximately the square of the increase in ratio above these mentioned.

Having thus described my invention, what I claim as new therein and desire to secure by Letters Patent is:

1. In a tractor of the character described, a frame, a transverse supporting axle with an end portion extended to one side of the said frame, a driven ground wheel mounted to rotate about the extended end portion of said axle, a swing frame mounted by the extended end portion of said axle, and extended along the side of the tractor, at the outside of said ground wheel, a ground wheel mounted by the swing frame, a resilient support for the tractor frame acting against the swing frame for support thereby, and a stabilizing linkage for the swing frame hingedly affixed to the tractor frame and having a hinged mounting in the swing frame and adapted to retain the alinement of the swing frame with the tractor frame without hindrance to its oscillation.

2. In a tractor of the character described, a main frame, a transverse pivot axle fixed in the main frame, with opposite end portions extended to opposite sides of the tractor frame, a transverse equalizer spring mounted in the frame forwardly of the pivot axle with ends extended to opposite sides of the tractor frame, driven ground wheels mounted to support the pivotal axle and to rotate about the extended end portions thereof, swing frames pivotally mounted on the extended end portions of the pivot axle at the outside of the ground wheels, ground wheels mounted by the swing frames at their oscillating ends in tracking alinement with the driven wheels, said equalizer spring having supporting engagement at its ends with the swing frames, and stabilizing linkage for the swing frames hingedly fixed to the tractor frame and to the swing frames and adapted to retain the swing frames in alinement with the tractor frame without hindrance to vertical oscillations thereof.

3. In a tractor of the character described, a frame, a transverse pivot axle with end portions thereof extended to opposite sides of the tractor, a transverse equalizer spring mounted in the frame for its support and having its end portions extended to opposite sides of the tractor, a swing frame beam at each side of the tractor pivotally mounted at one end on the corresponding end portion of the pivot axle, a bracket fixed to each beam to support thereon the adjacent end of the equalizer spring and having a leg extended along and inwardly spaced from the swinging end of the beam and formed with a bearing hub, a spindle shaft mounted in the hub and extended between the hub and beam, a ground wheel revolubly mounted on the spindle and shaft, and stabilizing linkage for each swing frame comprising a downwardly depending link mounted in the tractor to swing about a transversely directed hinge axis, and an arm rigidly fixed at one end to the inner end of the spindle shaft and extended along the swing frame bracket and having pivotal connection at its other end with the swinging end of said link to retain the alinement of the swing frame without interference to its vertical oscillation.

4. In a tractor, a main frame, a swing frame having pivotal mounting at one end on the said main frame and adapted to oscillate in a vertical plane at its other end, and comprising laterally spaced portions at the swinging end, a spindle shaft extended between said spaced portions, a ground wheel mounted on the spindle shaft, a stabilizing linkage for the swing frame comprising an arm extended along the frame and hingedly connected with the tractor frame and with the swing frame for maintaining the alinement of the swing frame without interference to its oscillating action and having an opening therethrough, and a transverse equalizer spring mounted in the tractor and having an end portion extended through said arm opening and supportingly engaged with the swing frame at a point in the plane of the ground contact line of the ground wheel.

5. In a tractor, a main frame, a swing frame having pivotal mounting at one end on the said main frame and adapted to oscillate in a vertical plane at its other end and comprising laterally spaced portions at its swinging end, the inner one of which is formed with an outwardly directed hub bearing, a spindle shaft mounted in the hub bearing and extended to the outer portion, a ground wheel revolubly mounted on the spindle shaft, and having a hollow, inwardly opening body, a lug on the hub bearing extending rearwardly therefrom and, located in the vertical plane of the ground contact line of the wheel, a stabilizing linkage for the swing frame comprising an arm rigidly fixed to the inner end of the spindle shaft and extended along the inner member of the swing frame and hingedly connected with the tractor frame; said arm having an opening therethrough, and an equalizer spring mounted in the tractor frame and extended through said opening into supporting contact with the said hub lug.

GEORGE S. ALLIN.